UNITED STATES PATENT OFFICE.

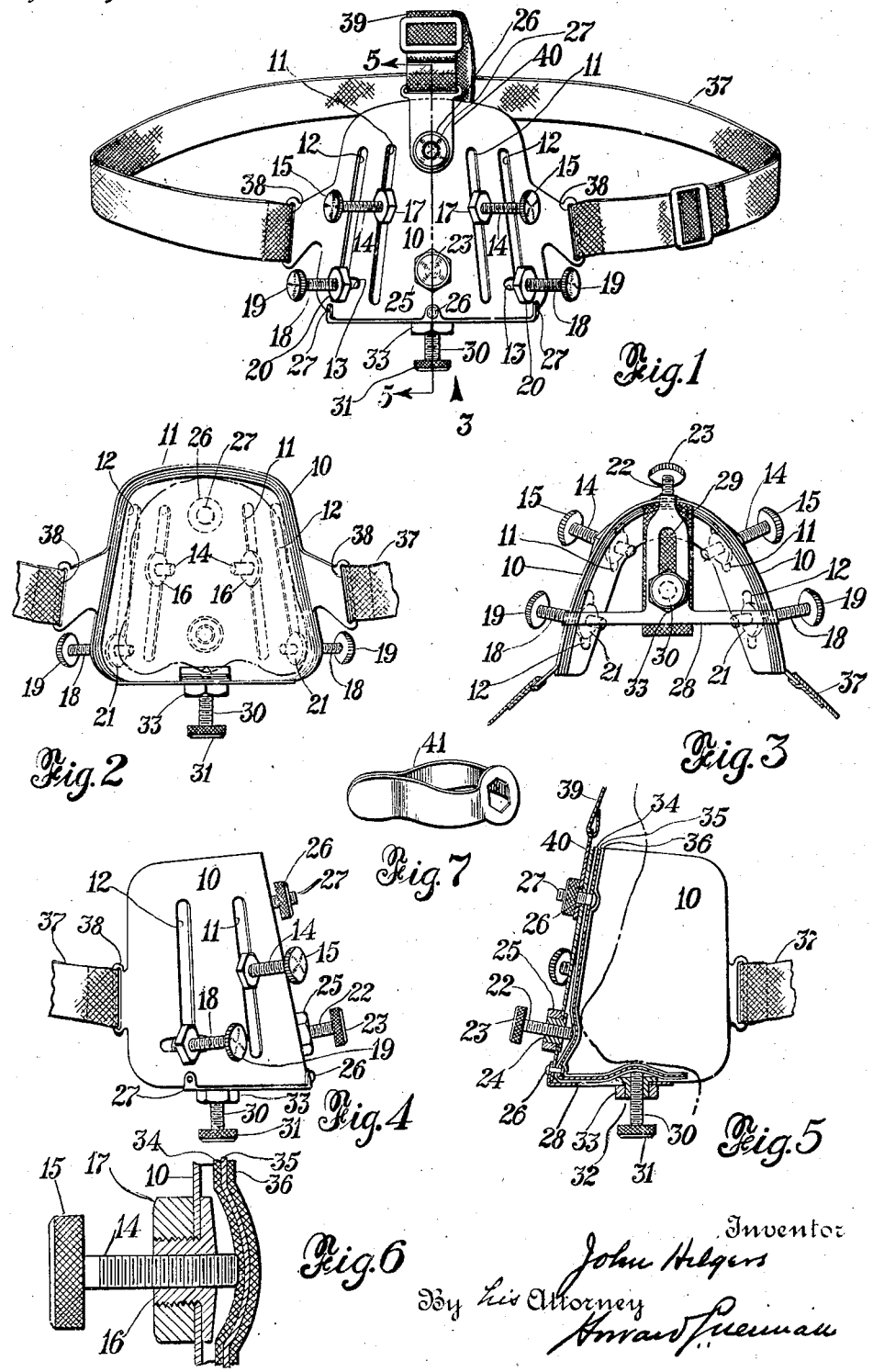

JOHN HILGERS, OF BINGHAMTON, NEW YORK.

NOSE-SHAPER.

1,378,455. Specification of Letters Patent. Patented May 17, 1921.

Application filed August 4, 1920. Serial No. 401,133.

*To all whom it may concern:*

Be it known that I, JOHN HILGERS, a citizen of the United States, residing in Binghamton, county of Broome, and State of New York, have invented certain new and useful Improvements in Nose-Shapers, of which the following is a full, clear, and exact specification.

My invention relates to nose shapers and refers particularly to nose shapers in which pressure upon the nose is the medium for accomplishing the desired results.

It is well known that many noses are of abnormal shape, resulting in a disfigurement of the facial appearance and frequently resulting in imperfect breathing with its consequent deleterious effect upon the health of the individual.

It is further well known that many of these abnormalities, and especially those relating to the flesh and softer cartilages, can be remedied and corrected by the more or less continuous pressure upon such parts to bring them to their proper positions.

The object of my invention is a device whereby this correction of shape by means of pressure may be accomplished quickly, effectively and with a minimum of discomfort to the individual.

It is evident that a device of this description must be of such a character and construction as to allow of its use upon practically every portion of the nose in order that it may be successfully employed, due to the fact that these deformities, or abnormal shapes, are not confined to any portion of the nose, but occur in all parts thereof.

My device accomplishes all of these desirable results and presents a means whereby proper pressure may be brought to bear upon any portion of the nose in order to correct the shape thereof.

In the accompanying drawings, illustrating one form of my device, similar parts are designated by similar numerals.

Figure 1 is a front view of one form of my device.

Fig. 2 is a rear view of Fig. 1.

Fig. 3 is a view in the direction of the arrow 3 of Fig. 1.

Fig. 4 is a side elevation of Fig. 1.

Fig. 5 is a section through the line 5—5 of Fig. 1.

Fig. 6 is an enlarged broken section showing the pressure means.

Fig. 7 is a perspective view of a device suitable for the tightening of the nuts of my device.

The device of the accompanying drawings comprises a non-resilient shell 10 of a concavo-convex formation suitable for placement over a nose. Within the shell 10 is a series of slots 11, 11 and a second series of slots, or openings, 12, 12, the latter of which have extended slots 13, 13 at approximately right angles thereto. Extending through each slot 11 is a threaded member 14 carrying the knurled head 15. The member 14 threads with the flanged head 16 which extends through the slot 11, the flanged portion abutting upon the inner face of the shell 10. The extended portion of the head 16 threads with the nut 17. It is evident, therefore, that by loosening the nut 17, the nut 17, the head 16 and the member 14 may be moved along the slot 11 to the desired position and that by tightening the nut 17, the three mentioned members will be in locked position.

In each slot, or opening, 12 there is a similar threaded member 18 with a knurled head 19, a nut 20 and a similar flanged head member 21, thus allowing the movement and locking of these members in each slot 12.

Centrally located in the lower portion of the shell 10 is a threaded member 22, with a knurled head 23, threading with the flanged head 24, which, in turn, threads with the nut 25, similarly to the above described members.

Centrally located in the upper portion of the shell 10 is a nut 26 threaded upon the member 27, for purposes described later.

Extending at approximately right angles from the lower portion of the shell 10, and attached thereto by the bolts 26, 27, 27 is a T-shaped member 28, having the slot, or opening, 29.

Situated within the slot 29, and slidable therethrough, is the threaded member 30 with the knurled head 31, threading with the flanged head 32 which, in turn, is threaded with the nut 33, similarly with the threaded members 14 and 18 and their attached members described above.

The shell 10 and the T-shaped member 28 thus form a frame of approximately the configuration of a nose.

Upon the under-side of the shell is a lining composed of the resilient metallic layer 34 inclosed between the two layers 35, 36 of chamois. The lining extends over the entire inner face of the shell 10 and also over the inner face of the T-shaped member 28 and is held from displacement by the member 27 and the bolt 26 which are flanged upon the metallic member 34 and are thus covered by the chamois layer 36.

A head belt 37 is attached to the two slots 38, 38 of the shell 10 and, when desired, the top head belt 39 may be attached to the member 27 by means of the plate 40, the other end of the belt 39 being attached to the rearward portion of the belt 37.

The operation of my device is as follows:—

Before placing the device upon the nose, the particular threaded members 14, 14, 18, 18, 22 and 30 are placed in their respective slots at the particular places where the pressure is needed to reshape the nose and locked in position. This is accomplished by means of the device 41, shown in Fig. 7, which is placed over the nut and the nut loosened. The nut, head and threaded member are then moved along the slot to the desired position and the nut fastened, thus locking the three members in position. When the threaded members are properly positioned, the device is placed over the nose and maintained in position by the head belts 37 and 39. The threaded members are now screwed inwardly, causing the lining to press upon the nose at the desired places, a proper pressure being maintained for proper periods of time to accomplish the desired results.

It is to be noted that as the lining is resilient, the pressure will not be at the inner point of the threaded member only, but will be distributed due to the curving of the resilient lining, thus causing greater efficiency of results with a minimum of discomfort to the wearer.

It is evident that the shell 10 may be of any non-resilient material and that the lining may be of any resilient material and that the described chamois of the latter may be dispensed with entirely, or substituted by any other suitable soft material.

I do not limit myself to the size, shape, number, material or arrangement of parts as shown and described, all of which may be varied without going beyond the scope of my invention as shown, described and claimed.

What I claim is:—

1. In a nose shaper, in combination, a non-resilient frame of the approximate configuration of a nose, a series of slots within the frame, a series of threaded members within the slots slidable therethrough and capable of inward movement therethrough, means for locking the threaded members in non-slidable predetermined positions within the slots and means for maintaining the frame in fixed position upon a nose.

2. In a nose shaper, in combination, a non-resilient frame of the approximate configuration of a nose, a resilient lining within the frame, a series of slots within the frame, a series of threaded members within the slots slidable therethrough and capable of movement therethrough causing an inward pressure upon the lining, means for locking the threaded members in non-slidable predetermined positions within the slots and means for maintaining the frame in fixed position upon a nose.

3. In a nose shaper, in combination, a non-resilient frame of the approximate configuration of a nose, a resilient lining within the frame, a soft material upon the inner face of the resilient lining, a series of threaded members capable of movement therethrough causing an inward pressure upon the lining and means for maintaining the frame in fixed position upon the nose.

4. In a nose shaper, in combination, a non-resilient frame of the approximate configuration of a nose, a resilient lining within the frame, a soft material upon the inner face of the resilient lining, a series of slots within the frame, a series of threaded members within the slots slidable therethrough and capable of movement therethrough causing an inward pressure upon the lining, means for locking the threaded members in non-slidable predetermined positions within the slots and means for maintaining the frame in fixed position upon a nose.

5. In a nose shaper, in combination, a non-resilient shell of the approximate configuration of the bridge of a nose, an extended member carried by the shell capable of placement around the extremity of a nose when the shell is placed upon the bridge thereof, a series of threaded members carried by the shell and capable of inward movement therethrough, a threaded member carried by the extended member and capable of movement therethrough and means for maintaining the device in fixed position upon a nose.

6. In a nose shaper, in combination, a non-resilient shell of the approximate configuration of the bridge of a nose, an extended member carried by the shell capable of placement around the extremity of a nose when the shell is placed upon the bridge thereof, a series of threaded members carried by the shell and capable of inward movement therethrough, a threaded member carried by the extended member and capable of movement therethrough, a resilient lining within the shell and extended member capable of being forced inwardly by the inward movements of the threaded members and means for maintaining the devices in fixed position upon a nose.

7. In a nose shaper, in combination, a non-resilient shell of the approximate configuration of the bridge of a nose, an extended member carried by the shell capable of placement around the extremity of a nose when the shell is placed upon the bridge thereof, a series of slots within the shell, a series of threaded members within the slots slidable along and capable of inward movement therethrough, means for locking the threaded members in non-slidable predetermined positions within the slots, a slot within the extended member, a threaded member within the last mentioned slot slidable along and capable of inward movement therethrough, means for locking this threaded member in non-slidable predetermined positions within the slot and means for maintaining the device in fixed position upon the nose.

8. In a nose shaper, in combination, a non-resilient shell of the approximate configuration of the bridge of a nose, an extended member carried by the shell capable of placement around the extremity of a nose when the shell is placed upon the bridge thereof, a series of slots within the shell, a series of threaded members within the slots slidable along and capable of inward movement therethrough, means for locking the threaded members in non-slidable predetermined positions within the slots, a slot within the extended member, a threaded member within the last mentioned slot slidable along and capable of inward movement therethrough, means for locking this threaded member in non-slidable predetermined positions within the slot, a resilient lining within the shell and extended member capable of being forced inwardly by the inward movements of the threaded members and means for maintaining the device in fixed position upon the nose.

9. In a nose shaper, in combination, a non-resilient shell of the approximate configuration of the bridge of a nose, an extended member carried by the shell capable of placement around the extremity of a nose when the shell is placed upon the bridge thereof, a series of slots within the shell, a series of threaded members within the slots slidable along and capable of inward movement therethrough, means for locking the threaded members in non-slidable predetermined positions within the slots, a slot within the extended member, a threaded member within the last mentioned slot slidable along and capable of inward movement therethrough, means for locking this threaded member in non-slidable predetermined positions within the slot, a resilient lining within the shell and extended member capable of being forced inwardly by the inward movements of the threaded members, a soft material upon the inner face of the resilient lining and means for maintaining the device in fixed position upon the nose.

10. In a nose shaper, in combination, a non-resilient shell of the approximate configuration of the bridge of a nose, an extended member carried by the shell capable of placement around the extremity of a nose when the shell is placed upon the bridge thereof, a series of slots within the shell, a series of threaded members within the slots slidable along and capable of inward movement therethrough, means for locking the threaded members in non-slidable predetermined positions within the slots, a slot within the extended member, a threaded member within the last mentioned slot slidable along and capable of inward movement therethrough, means for locking this threaded member in non-slidable predetermined positions within the slot, means carried by the shell for the attachment of head bands and head bands attached thereto for maintaining the device in fixed position upon the nose.

11. In a nose shaper, in combination, a non-resilient shell of the approximate configuration of the bridge of a nose, an extended member carried by the shell capable of placement around the extremity of a nose when the shell is placed upon the bridge thereof, a series of threaded members carried by the shell and capable of inward movement therethrough, a threaded member carried by the extended member and capable of movement therethrough, a threaded member positioned centrally in the lower portion of the shell capable of inward movement therethrough and means for maintaining the device in fixed position upon a nose.

12. In a nose shaper, in combination, a non-resilient shell of the approximate configuration of the bridge of a nose, an extended member carried by the shell capable of placement around the extremity of a nose when the shell is placed upon the bridge thereof, a series of threaded members carried by the shell and capable of inward movement therethrough, a threaded member carried by the extended member and capable of movement therethrough, a resilient lining within the shell and extended member capable of being forced inwardly by the inward movements of the threaded members, a threaded member positioned centrally in the lower portion of the shell capable of inward movement therethrough and means for maintaining the device in fixed position upon a nose.

13. In a nose shaper, in combination, a non-resilient shell of the approximate configuration of the bridge of a nose, an extended member carried by the shell capable of placement around the extremity of a nose when the shell is placed upon the bridge thereof, a series of slots within the shell, a series of threaded members within the slots slidable along and capable of inward movement therethrough, means for locking the threaded members in non-slidable predetermined positions within the slots, a slot within the extended member, a threaded member within the last mentioned slot slidable along and capable of inward movement therethrough, means for locking this threaded member in non-slidable predetermined positions within the slot, a threaded member positioned centrally in the lower portion of the shell capable of inward movement therethrough and means for maintaining the device in fixed position upon the nose.

14. In a nose shaper, in combination, a non-resilient shell of the approximate configuration of the bridge of a nose, an extended member carried by the shell capable of placement around the extremity of a nose when the shell is placed upon the bridge thereof, a series of slots within the shell, a series of threaded members within the slots slidable along and capable of inward movement therethrough, means for locking the threaded members in non-slidable predetermined positions within the slots, a slot within the extended member, a threaded member within the last mentioned slot slidable along and capable of inward movement therethrough, means for locking this threaded member in non-slidable predetermined positions within the slot, a resilient lining within the shell and extended member capable of being forced inwardly by the inward movements of the threaded members, a threaded member positioned centrally in the lower portion of the shell capable of inward movement therethrough and means for maintaining the device in fixed position upon the nose.

15. In a nose shaper, in combination, a non-resilient shell of the approximate configuration of the bridge of a nose, an extended member carried by the shell capable of placement around the extremity of a nose when the shell is placed upon the bridge thereof, a series of slots within the shell, a series of threaded members within the slots slidable along and capable of inward movement therethrough, means for locking the threaded members in non-slidable predetermined positions within the slots, a slot within the extended member, a threaded member within the last mentioned slot slidable along and capable of inward movement therethrough, means for locking this threaded member in non-slidable predetermined positions within the slot, a threaded member positioned centrally in the lower portion of the shell capable of inward movement therethrough, means carried by the shell for the attachment of head bands and head bands attached thereto for maintaining the device in fixed position upon the nose.

Signed at Binghamton, in the county of Broome and State of New York this 2nd day of August, 1920.

JOHN HILGERS.